United States Patent [19]

Rokhman

[11] 4,384,339
[45] May 17, 1983

[54] STRIP MATERIAL AREA-METER
[76] Inventor: Max G. Rokhman, 23 Avgusta, 65, kv. 42, Kharkov, U.S.S.R.
[21] Appl. No.: 199,280
[22] Filed: Oct. 21, 1980
[51] Int. Cl.³ .............................................. G01B 5/26
[52] U.S. Cl. ................................... 364/564; 364/562; 377/24
[58] Field of Search ................ 364/556, 560, 562–564; 235/92 DN, 92 MT; 33/121–124

[56] References Cited
U.S. PATENT DOCUMENTS

| 3,264,739 | 8/1966 | Berlinsky et al. ............ 235/92 DN |
| 3,600,562 | 8/1971 | Dinicolantonio et al. .......... 364/562 |
| 3,710,084 | 1/1973 | Slagley et al. ...................... 364/562 |
| 3,721,809 | 3/1973 | Strandberg, Jr. et al. .... 235/92 DN |
| 3,916,174 | 10/1975 | Moule ................................... 364/562 |
| 4,058,712 | 11/1977 | Bachman ............................. 364/564 |
| 4,144,575 | 3/1979 | Schwarz .............................. 364/562 |
| 4,260,877 | 4/1981 | Conway ....................... 235/92 DN |

FOREIGN PATENT DOCUMENTS

| 304324 | 6/1971 | U.S.S.R. . |
| 338580 | 6/1972 | U.S.S.R. . |
| 434383 | 10/1974 | U.S.S.R. . |

Primary Examiner—Gary Chin
Attorney, Agent, or Firm—Holman & Stern

[57] ABSTRACT

Apparatus for measuring strip material area comprises a length-meter, a breakage-sensor, and a strip cutter, all having outputs connected to inputs of an inhibit circuit, a frequency divider, and an output counter. The cutter has one input connected to the length-meter output and another connected to the breakage-sensor output. A two-position switch has one position connected to the inhibit unit output and a second position connected to an AND gate output having one input connected to the output of an overflow blocking unit, the other AND gate input connected to a reference frequency generator output and a count input of a controlled frequency divider having control inputs connected to intermediate memory counter outputs and to overflow blocking unit. The intermediate memory count input is connected to an input of a two-position switch; its clearing input is connected to a common clearing line. A reference frequency generator output is connected to count inputs of two controlled frequency dividers. Connected through NAND gates to the control inputs of one controlled frequency divider is a correction input unit. The NAND gates have common inputs connected to the second position of the second switch having a grounded switch arm. Outputs of the two frequency dividers are connected to a coincidence circuit through a time interval generator with control inputs connected to a width-setting unit. The coincidence circuit output is connected to the output counter wherein the clearing input is connected to the time interval generator clearing output.

6 Claims, 4 Drawing Figures

STRIP MATERIAL AREA-METER

BACKGROUND OF THE INVENTION

1. Field of the Invention

The present invention relates to measuring instruments, and particularly to a digital frequency measuring device for measuring area of strip materials in the course of rolling-up thereof.

The invention is applicable in the paper and pulp industry, chemical industry, and the textile industry for measuring area of strip materials being rolled up.

2. Description of the Prior Art

In the modern production of strip materials there is a need for measuring devices capable of simultaneously measuring with a high accuracy the area of several different-size strip products in the course of rolling-up thereof, and which measuring devices can be readily checked for their precision in operation.

The existing measuring devices, and in particular digital-frequency meters do not fully conform to these requirements.

Known in the art, for instance, is an area meter for measuring area of strip materials being rolled up on a plano-cutting machine (cf. USSR Inventor's Certificate No 434,383, Int. Cl. G 05 D 3/08), which comprises a sectionalized displacement pulse-type pick-up, breakage and cut sensors, a control signal unit of the cutting machine drive, a size selector switch, and area meter fitted with a dial indicator.

The above measuring device, however, has a number of disadvantages. First, apart from the fact that sectionalized pulse-type displacement pick-ups having a high resolving power are complex to manufacture, this device is not capable of being rapidly adjusted to the sizes which are not provided for in the construction thereof, should these sizes prove desirable. Readjustment of the device in such a case involves a reduction gear with a special gear ratio related to the scale used. Second, the presence of several registering devices incorporated in the above device (the number of the registering devices being taken according to the number of different-size strip products being simultaneously rolled up) makes the construction thereof complex.

In addition, the above measuring device records values in units of area, which is effected by measuring length by the displacement pick-ups directly in the units of area. This is realized by selecting an adequate gear ratio and the number of orifices in the cylindrical body of the displacement pick-ups, which makes it impossible to check and control the measurement accuracy of the measuring device in operation.

There is also known a digital frequency area meter for measuring area of strip materials being rolled-up on a plano-cutting machine (cf. USSR Inventor's Certificate No 304,324, Int. Cl. D 21 G 9/00), comprising a length meter, a breakage sensor, a means for cutting off the strip product from the roll, a process blocking circuit, a size selector switch, and an output counter unit incorporating a clearing circuit. The process blocking circuit has inputs connected to the outputs of the pick-ups, an output connected to an input of a controlled frequency divider having a control input connected to outputs of the size selector switches, and an output connected to the output registering device.

In operation the pulses generated by the length meter are applied through the process blocking circuit to the count-input of the controlled frequency divider having its control inputs switched by the size selector switches so that, in response to a train of pulses applied to its input, at its output there appear pulses whose number is equal to the area of the strip material in the roll.

This measuring device has a low precision of measurement, which is accounted for by the fact that for obtaining a required scale spacing of the output pulse in the controlled frequency divider there is generated one output pulse from the train of pulses applied to its input. Thus, the resolving power of the device is much lower than that of the length meter. The extent of this "rounding-off" depends on the width of the strip material being rolled up. In addition, this device cannot be checked for measurement precision during operation. The presence of several controlled frequency dividers and output counter devices in the case of simultaneously controlling several different-size rolls makes the construction of this device complex.

The above area meter for measuring area of strip materials may incorporate a means for cutting off the strip product from the roll (cf. USSR Inventor's Certificate No 338,580, Int. Cl. D 21 G 9/00), which means comprises a paper level pick-up for indicating the level of the paper in the roll, a control unit, and a memory unit. The level pick-up is made in the form of a magnetic head whose recording input and reading output are connected to the control unit. The level pick-up is mounted on the shaft of the cutter of the reeling mechanism, while the memory unit is a magnetic tape fixed perpendicularly to the axis of said shaft.

In the case of breakage of the strip product being rolled up a corresponding mark is recorded on the magnetic tape by a recording pulse from the magnetic head. The deformed portion of the product, resulting from the breakage thereof, is cut off by the operator. In this case the area-measuring device will operate again only when the mark indicative of the breakage recorded on the tape reaches a magnetic pick-up head.

The operational accuracy of the above cutting device is not sufficient which is due to that the cutter shaft with the magnetic head of the paper level pick-up vibrates relative the magnetic tape, with the vibration amplitude being within the range from 1 to 2 mm. In addition, the application of this measuring device is limited because the paper level pick-up incorporated in this measuring device is applicable only on the reeling machines wherein the material being rolled is engaged from above.

SUMMARY OF THE INVENTION

The main object of the invention is to provide an area-measuring device for measuring the area of the material being rolled up wherein the constructional changes and improvements thereof ensure a high measurement accuracy in simultaneously measuring several different-size rolls and make the measuring device capable of being checked for the measurement precision during operation.

Another object of the invention is to improve the accuracy in rolling materials with a predetermined length.

Still another object of the invention is to rule out repeatedly measuring portions of the material, removed after the breakage thereof.

Further objects and advantages of the present invention will become apparent from the reading of the attached specification and the accompanying drawings.

These and other objects of the invention are accomplished by a strip material area measuring device comprising a length-meter, a breakage sensor, and a device for cutting off the material from roll, all the three having outputs connected to inputs of a process blocking circuit, a controlled frequency divider, and an output counter, and which, according to the invention further includes an intermediate memory counter having a clearing input, a second frequency divider, AND logic circuit, a reference frequency generator, correction input unit, logic circuits NAND, a common clearing line, a time interval generator with a width setting unit, a coincidence circuit, an overflow blocking unit, two two-position switches, the device for cutting off the material being rolled up having two inputs, one of which inputs being connected with the other output of the length-meter, with the second input being connected to the other output of the breakage sensor, the output of the process blocking circuit being connected to the lead-out of the first position of one of the two-position switches, the second position lead-out of which is connected to the output of the AND logic circuit having one input connected to the output of the overflow blocking unit, and a second input connected to the output of the reference frequency generator and to a count input of the controlled frequency divider having inputs connected to the outputs of the intermediate memory counter and to the inputs of the overflow blocking unit, the count input of the intermediate memory counter being connected with the lead-in of one two-position switch, and the clearing input of the same intermediate memory counter connected with the common clearing line, the output of the reference frequency generator being connected to the count inputs of both controlled frequency dividers, the controlled frequency divider having its control inputs connected through the NAND logic circuits to the correction input unit, the NAND logic circuits having inputs connected to each other and to the second position lead-out of the second two-position switch having its lead-in grounded, the output of the first controlled frequency divider and the output of the second controlled frequency divider being connected through the time interval generator to the inputs of the coincidence circuit, which time interval generator has its control inputs connected to at least one width setting unit, and the coincidence circuit having its output connected to the input of the counter device having a clearing input connected to the output of the time interval generator.

Such construction of the strip material area measuring device makes it possible to considerably improve the measurement accuracy, to measure the area of any different-size rolls, and to check for the measurement precision of the device during operation.

It is expedient that the device for cutting off the material being rolled up, incorporated in this area measuring device, have a material level pick-up including a pulse-type speed counter mounted on the reeling machine shaft, a memory unit and a control unit. The control unit includes an AND logic circuit and a single impulse generator whose input is one of the inputs of the control unit and is connected with an AND logic circuit, whereas the output of the single impulse generator serves as one of the outputs of the control unit, an RS flip-flop circuit whose inputs R and S serve as the other inputs of the control unit, and a T flip-flop circuit whose direct and inverse outputs serve as the other outputs of the control unit, the other input of the AND logic circuit is connected to the direct output of the RS flip-flop having its inverse output connected to the input of the process blocking circuit, with the AND logic circuit having its output connected to the input of the T flip-flop. The memory unit includes four AND logic circuits, two counter-registers, and a comparator circuit, with the first input of the first AND logic circuit and the first and second inputs of the second, third and the fourth AND logic circuits being the inputs of the memory unit, and the output of the comparator circuit serving as an output of the memory unit. The first input of the first AND logic circuit is connected to the direct output of the T flip-flop and to the first input of the third logic circuit, and the second input of the same first AND logic circuit is connected to the first input of the second AND logic circuit and to the output of the length meter, whereas its output is connected to the count input of the first counter-register. The second and the first AND logic circuits have their second inputs connected to the inverse output of the T flip-flop circuit. The fourth AND logic circuit has its first input combined with the second input of the third AND logic circuit and connected to the output of the single impulse generator, whereas the outputs of these logic circuits are connected each with a corresponding clearing input of the second and the first counter-registers having their outputs connected to the inputs of the comparator circuit having an output connected to the input S of the RS flip-flop circuit. The second AND logic circuit has its output connected to the count input of the second counter-register.

Such construction of the proposed measuring device rules out repeated registering of the portions of material removed after the breakage thereof.

For generation of the signals to start braking and to stop the reeling mechanism when the predetermined radius of the roll has been attained, the device for cutting off the product being rolled incorporates two switching units and two coincidence circuits, as well as a control unit. Each switching unit has its inputs connected in position-access order to a corresponding output of the respective counter-register of said memory unit, and outputs connected to inputs of the respective comparator circuits having their outputs connected to the inputs of the control unit having outputs adapted to be connected with actuating mechanisms for braking and stoppage of the reeling machine.

It is expedient that the proposed measuring device include a control signal generating unit incorporating a scaling unit, two code-to-digit converters, an RS flip-flop, a logic circuit comprising two two-input AND gates having their outputs connected to respective inputs of a two-input OR gate and hereinafter referred to as a 2 AND-2 AND- "OR" logic circuit, a logic circuit AND, a counter unit, a switching circuit and a number value input unit. In this case the output of the length meter is connected to one of the inputs of the AND logic circuit and to the input of the scaling unit having its output connected to an information input of the first code-to-digit converter and to one of the first pairs of inputs of the 2 AND-2 AND-OR logic circuit whose second input is connected to the inverse output of the RS flip-flop. The first code-to-digit converter has its inputs connected to the first outputs of the number value input unit whose second outputs are connected to control inputs of the second code-to-digit converter, and whose enabling inputs are connected to the outputs of the switching circuit having one its input connected to the input S of the RS flip-flop, to the clearing inputs of said converters and to the common clearing line of the measuring device, and its second input to the output of the second converter whose information input is connected to the output of the 2 AND-2 AND-OR logic circuit whose one input of the second pair of the inputs to the direct output of the RS flip-flop and to the second input of the AND logic circuit, and the second input of the same pair of inputs is connected to the output of the AND logic circuit and to the input of the counter unit having its output connected to the input R of the RS flip-flop.

BRIEF DESCRIPTION OF THE DRAWINGS

The invention will now be explained in greater detail with reference to embodiments thereof which are represented in the accompanying drawings, wherein.

DETAILED DESCRIPTION OF THE INVENTION

Figure 1:
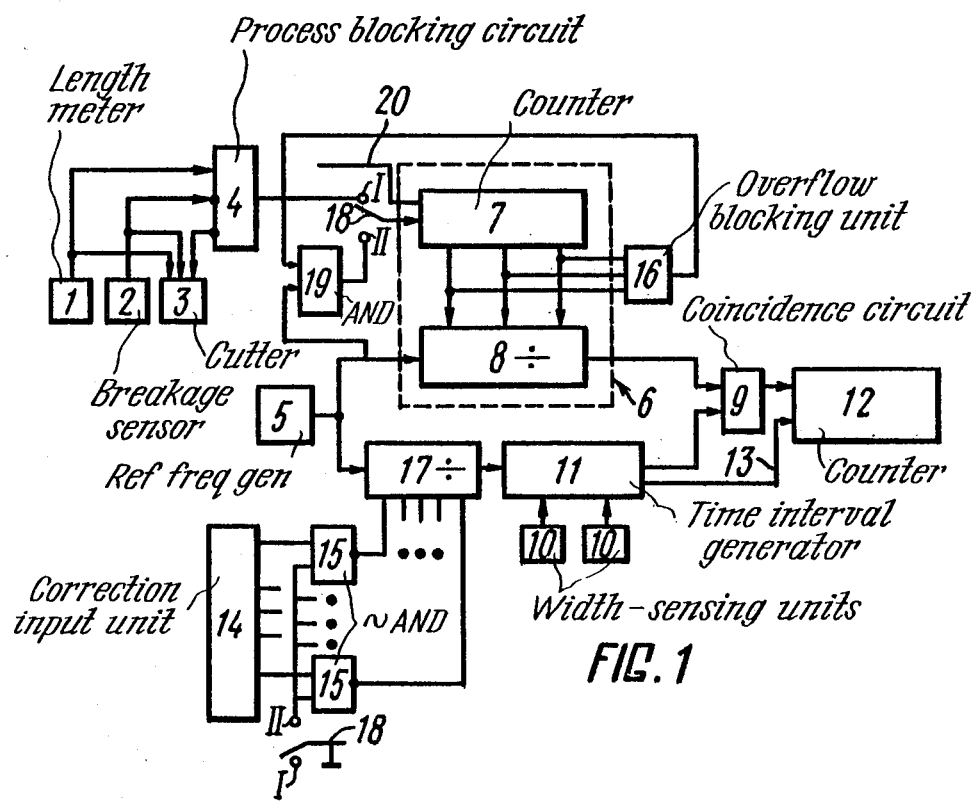
FIG. 1 is a block diagram of the strip material area measuring device for measuring area of strip materials being rolled up.

An area measuring device for measuring area of strip materials being rolled up comprises a pulse-type length meter 1 (FIG. 1) mounted on the carrying shaft of a plano-cutting machine, a breakage sensor 2, a cutting device 3 for cutting off the material being rolled up, a process blocking circuit 4 having its inputs connected to the outputs of the length meter 1, of the breakage sensor 2, and of the cutting device 3 whose inputs are connected to the outputs of the length meter 1, and of the breakage sensor 2. The proposed area measuring device further includes a reference frequency generator 5, a frequency converter 6 comprising an intermediate frequency counter 7 and a first controlled frequency divider 8, a coincidence circuit 9, width setting units 10, the number of which width setting units may vary depending on the operational conditions, a time interval generator 11, a counter device 12 having a clearing input 13, a correction input unit 14, NAND circuits 15, an overflow blocking unit 16, a second controlled frequency divider 17, two two-position switches 18, a circuit AND 19, and a common clearing line 20. The input of the counter device 12 is connected to the output of the coincidence circuit 9 having one input connected to the output of the first controlled frequency divider 8, and the other input connected to the output of the time interval generator 11 whose control inputs are connected to the outputs of the width-setting units 10, and whose count input is connected to the output of the second controlled frequency divider 17. A count input of the first controlled frequency divider is connected to the output of the generator 5, and control inputs of which controlled frequency divider are connected in a position-access order to the outputs of the intermediate memory counter 7 having its input connected to the first switch 18. A first position lead-out of the switch 18 is connected to the output of the process blocking circuit 4, whereas a second position lead-out of the switch 18 is connected to the output of the circuit 19 AND having one its input connected to the output of the reference frequency generator 5, and its second input connected to the output of the overflow blocking unit 16 of the intermediate memory counter 7. Inputs of the unit 16 are connected to the outputs of the counter 7. The second switch 18 is grounded and its second position lead-out is connected to the first inputs of the NAND circuit 15. Second inputs of the NAND circuit 15 are connected to the correction input unit 14 and the outputs of this circuit are connected to the control inputs of the second controlled frequency divider 17 whose count input is connected to the output of the reference frequency generator 5. The counter unit 12 clearing input is connected to the clearing output of the time interval generator 11, and the clearing input of the intermediate memory counter 7 are connected to the common clearing line 20.

In drawings the switches 18 are shown having their first position closed (operation mode) and the second position open (control mode).

Figure 2:
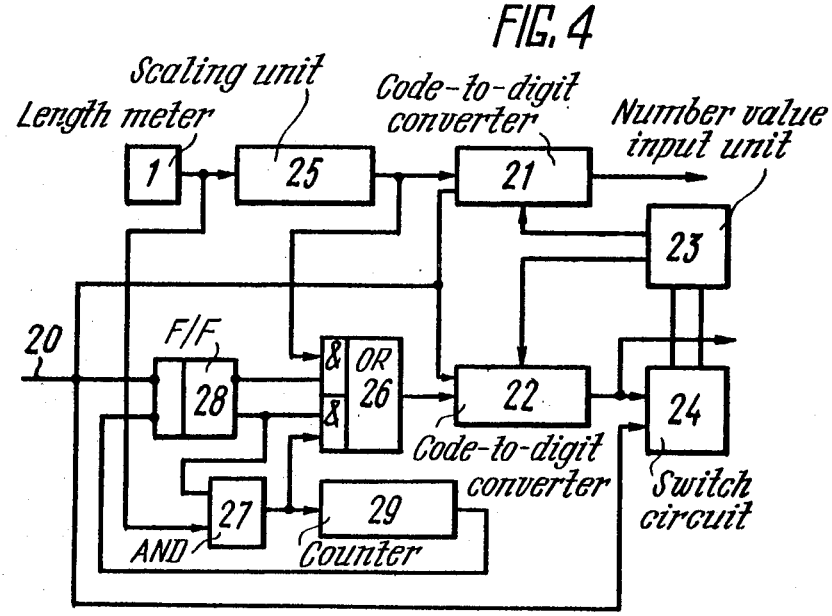
FIG. 2 diagrammatically represents a control signal generating unit according to the invention.

For widening the functional capabilities of the proposed area measuring device and improving the accuracy in rolling-up of strip material to a predetermined length it is expedient to provide this measuring device with a control signal generator incorporating two code-to-digit converters 21, 22 (FIG. 2), a number value input unit 23, a switching circuit 24, a scaling unit 25, a 2AND-2AND-OR circuit 26, an AND circuit 27, a flip-flop circuit RS 28, and a counter unit 29. One of the inputs of the AND circuit 27 is connected to the input of the length meter 1 and to the input of the scaling unit 25 having its output connected to the information input of the first code-to-digit converter 21 and to one of the inputs of the first pair of inputs of the 2AND-2AND-OR circuit 26 whose second input is connected to the inverse output of the flip-flop 28. The control inputs of the converter 21 are connected to the first outputs of the number value input unit 23 having its second outputs connected to the control inputs of the second converter 22 and its enabling inputs connected to the outputs of the switching circuit 24 having one input connected to the input S of the flip-flop 28 and to the clearing inputs of the converters 21, 22 and to the common clearing line 20, and its second input connected with the output of the converter 22. The converter 22 has its information input connected with the output of the 2AND-2AND-OR circuit 26 having one of the second pair of inputs connected to the direct output of the flip-flop 28 and to the second input of the AND circuit 27, and its second input of the same input pair, connected to the output of the circuit 27 and to the input of the counter unit 29 whose output is connected to the input P of the flip-flop 28. The outputs of the converters 21, 22 are connected respectively to actuating mechanisms adapted one to start braking the reeling mechanism and the other one to stop the latter.

Figure 3:
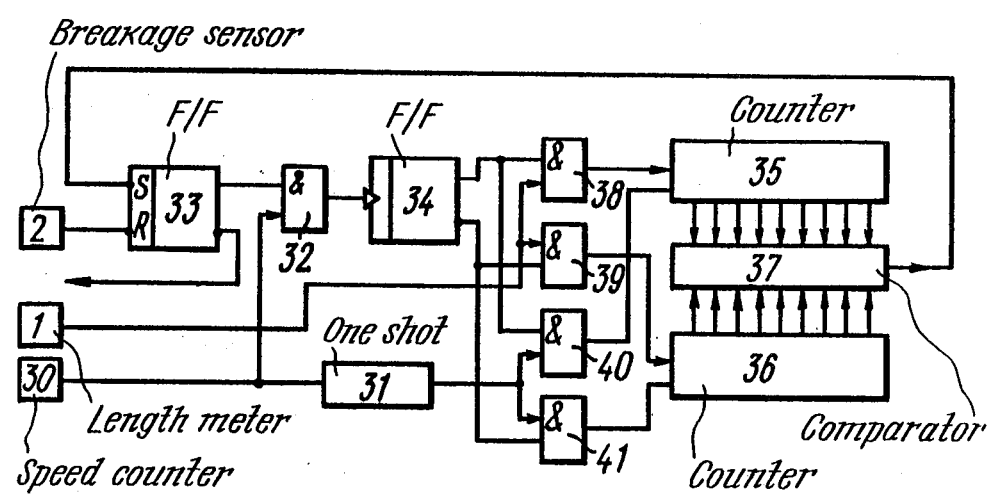
FIG. 3 diagrammatically represents one modification of the device for cutting off the strip material being rolled up.

As can be seen in FIG. 3, for the purpose of ruling out repeated registering and counting of the portions of the material removed as a result of breakage thereof the device 3 for cutting off the strip material from the roll may be constructed in the form of a level pick-up adapted for indicating the level of the material in the roll, comprising a pulse-type speed counter 30 for measuring the speed of rolling, having a resolution of 1 pulse per revolution and being mounted on the reel shaft, a control unit including a single impulse generator 31, an RS flip-flop 33, an AND circuit 32, and a T flip-flop 34, and a memory unit incorporating two counter-registers 35, 36, a comparator circuit 37, and four AND circuits 38, 39, 40 and 41. The output of the speed counter 31 is connected to one of the inputs of the AND circuit 32 having its second input connected to the direct output of the flip-flop 33, and its output connected to the count input of the flip-flop 34. The first inputs of the AND circuits 38, 39 are connected to the output of the length meter 1, the second input of the AND circuit 38 is connected to the direct output of the flip-flop 34 and to the first input of the AND circuit 40, and the output of the same circuit 38 is connected to the count input of the counter-register 35. The AND circuit 39 has its second input connected to the inverse output of the flip-flop 34 and to the first input of the AND circuit 41, and its output connected to the count input of the counter-register 36 whose clearing input is connected to the output of the AND circuit 41 having its second input connected to the output of the single impulse generator 31 and to the second input of the AND circuit 40 whose output is connected to the clearing input of the counter-register 35. The outputs of the registers 35, 36 are connected to the inputs of the comparator circuit 37 having its output connected to the input S of the flip-flop 33 whose input R is connected to the output of the breakage sensor 2 and whose inverse output is the output of the area measuring device.

Figure 4:
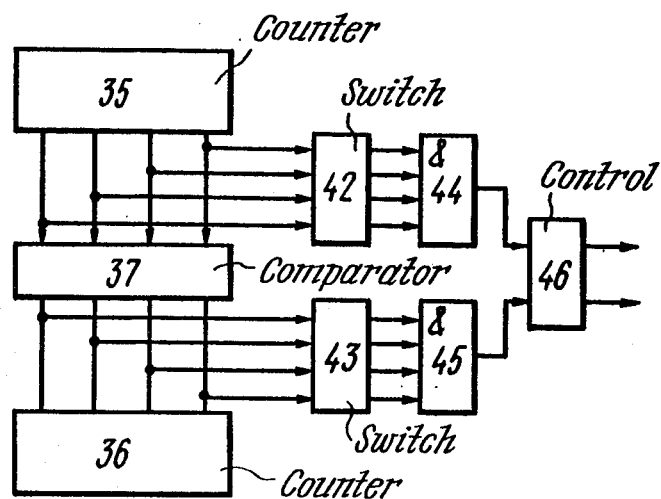
FIG. 4 diagrammatically represents another modification of the device for cutting off the strip materials being rolled up.

According to one modification of the proposed area measuring device with the purpose of widening the functional capabilities of the device and, in particular, for providing "start of braking" and "stop" signals for braking and stopping the reeling mechanism when the predetermined radius of the roll is reached, the device for cutting the strip material being rolled up is provided with switching units 42, 43 (FIG. 4), coincidence circuits 44, 45, and a control unit 46. The switching circuits 42, 43 have their inputs connected in a position-access order to corresponding outputs of the counter-registers 35, 36, and their outputs connected to the inputs of the coincidence circuits 44, 45 whose outputs are connected to the inputs of the control unit 46 having outputs adapted for being connected to actuating mechanisms to start braking of and to stop the reeling mechanism.

The proposed area measuring device operates as follows.

In the operation mode (the selector switch is in its first position) the measuring cycle includes two steps, namely, metering the length and calculating the area. During the first step the pulses from the length meter 1 are applied, as the material moves, through the process blocking circuit 4 and the switch 18 to the input of the intermediate frequency counter 7 of the converter 6. This operation ceases when the material being rolled up stops moving. During this period the number of pulses from the length meter 1 recorded by the counter will be $$N_x = (l \cdot z)/\pi D_b \tag{1}$$

where
l = length of the material being moved,
z = resolution of the length meter,
$\pi D_b$ = circumference of the carrying shaft of the reeling mechanism.

Controlling the output frequency of the first controlled frequency divider 8 is effected according to the function $N_x$.

Therefore during the second step operation the output frequency of the controlled frequency divider 8 is found from the equation $$f_x = (f_o \cdot N_x)/2^n \tag{2}$$

where
$f_o$ = a frequency of the reference frequency generator 5,
n = the number of bits of the controlled frequency divider 8.

Thus, the output frequency value of the controlled frequency divider 8 is proportional to the length of the material being rolled up with the precision depending on the resolution of the length meter 1.

Calculating the area is effected by applying logic multiplication carried out by the coincidence circuit 9 to one of the inputs of which is applied a frequency $f_x$ proportional to the length of the material being rolled up, and to whose other input is applied an enabling gate voltage pulse from the output of the time interval generator, the length of which gate voltage pulse is selected proportional to the width of the roll so that each pulse applied from the output of the coincidence circuit 9 to the input of the output counter device 12 corresponds to the area unit of the roll (sq. m).

The number of pulses $N_s$ at the output of the coincidence circuit 9 thus enabled by the gate voltage pulse for the period of duration thereof is equal to $$N_s = f_k \cdot t \tag{3}$$

where t = gating voltage pulse duration.

The gate voltage pulse duration t is generated by the generator 11 and determined as a sum $N_a$ of the periods of the frequency $f_t$ arriving at the input of the generator 11, i.e.

$$t = (N_a/f_t) \tag{4}$$

The value $N_a$ is entered into the time interval generator 11 by the width setting device in the form of $$Na_a = a_s \cdot 1000 \tag{5}$$

where $a_s$ = width of the roll in meters.

Taking into account the equations (1), (2), (3), (4) and (5) the number of the pulses $N_s$ at the output of the coincidence circuit 9 will be $$N_s = \frac{f_o \cdot z \cdot 1000}{f_t \cdot 2^n \pi D_b} \cdot l \cdot a_s \tag{6}$$

The frequency $f_t$ is generated at the output of the second controlled frequency divider 17 in the form of overlay of the binary components of the frequency of the reference frequency generator 5

$$f_t = k \cdot f_o \tag{7}$$

where $k = z \cdot 1000/(2^n \cdot \pi D_b)$ = correction coefficient entered into the measuring device by the correction input unit 14.

Thus, at the end of the second operation step the number of the pulses at the output of the coincidence circuit 9 will be $$N_s = l \cdot a_s \tag{8}$$

While filling in the time interval generator 11 the overflow pulse is applied to the clearing input 13 to clear the counter device 12. The area calculation cycle is then repeated.

Before the next rolling is started the intermediate memory counter 7 is reset by the clearing pulse transmitted through the line 20.

If the size of the next roll differs from the preceding one the readjustment is effected with the aid of the width setting unit 10. When in the course of rolling the material is cut to different sizes the time interval generator is set by the width setting units 10 for the required number of predetermined values corresponding to the widths of the rolls to be formed, with the counting of the area values being done alternately.

In the case of breakage of the strip material being rolled up, or making up for the removed portions of the material the signals from the pick-ups 2 and 3 block the pulses from the length meter 1 preventing them from being applied through the inverse inputs of the process blocking circuit 4 to the counter 7.

In the control mode the switches 18 are turned to their second position, in which case to one of the inputs of the NAND circuits 15 are applied a "ZERO" signal in response to which at the outputs of said circuits there appears "ONE" irrespective of the value of the correction coefficient K entered into the unit 14. In this case at the second controlled frequency divider there is a frequency $$f_T = f_o \qquad (9)$$

The frequency signal from the output of the reference frequency generator 5 through the AND circuit 19 and the switch 18 is transmitted to the input of the counter 7. As soon as the intermediate memory counter 7 is filled, at all of its outputs there appears a signal "1" in response to which a signal "0" will appear at the overflow blocking unit 16 output connected to one of the inputs of the AND circuit 19, to inhibit a further transmission of the generator 5 frequency $f_o$ pulses to the input of the counter 7. Thus, when the signal "0" appears at one of the inputs of the AND circuit 19 in the counter 7 will be recorded the number $2^n$ equal to the register length of the counter 7, in which case at the output of the controlled frequency divider 8 there appears in accordance with (2) a frequency $$f_x = f_o \qquad (10)$$

In the case of correct functioning of all the units of the area measuring device at the output of the coincidence circuit 9 in conformity with equations (3), (4), (5), (9) and (10) there appears the number of pulses, being equal to $$N_s = 1000 \cdot a_s,$$

which number corresponds to the value of the size entered into the area measuring device. The control time is determined by the time of filling in the intermediate memory counter 7 with the frequency $f_o$ pulses.

Since the generation of the frequency proportional to the length of the material being rolled up, and of the interval duration proportional to the width thereof, is effected by one and the same reference frequency generator 5 the instability thereof does not cause errors in the area measurements (see equations 7 and 6).

In addition, the proposed measuring device can be readily readjusted to a diameter of the carrying shaft of the reeling mechanism.

Compared to the prior art apparatus the measuring device of the invention features a higher measurement precision, allows measuring the area of rolls practically of any size, and can be checked for its measurement precision in the course of operation.

The device for cutting off the material being rolled up, incorporated in the measuring device of the invention operates as follows. In the course of reeling on a strip material the signal applied to the input R of the flip-flop circuit 33 (FIG. 2) holds the latter in condition "1", thereby permitting the pulses from the speed counter 30 to pass through the AND circuit 12 to the input of the flip-flop circuit 34. Since per one revolution of the carrying shaft at the output of the speed counter 30 there appears only one pulse, the flip-flop circuit condition changes each time accordingly, permitting the pulses from the output of the length meter 1 to pass through the corresponding AND circuits 38, 39 to the input of one of the two counter-registers 35, 36. The single impulse generator 31 forms at the leading edge of the pulse from the speed counter 30 a clearing pulse which is transmitted through a corresponding AND circuit 40, 41 to the input of said counter-register which records during said revolution of the shaft the information from the length meter 1, i.e. at each moment of time one counter-register, for instance 35, stores information on the length of the preceding turn, while the other one, for instance 36, records the information on the length of the turn being formed. During the next revolution of the shaft the information stored in the register 35 is erased, i.e. cleared (at the leading edge of the pulse from the speed counter 30) and a new information on the length of the turn being formed is recorded, while the counter-register 36 now stores the information on the length of the preceding turn.

As during the reeling the output signals from the registers 35, 36 differ from each other, no signal appears at the output of the coincidence circuit.

In case the strip material being reeled on is broken a signal applied to the input R of the flip-flop circuit 33 will hold the latter neutral, thereby inhibiting transmission of pulses from the speed counter 30 through the AND circuit 32 to the input of the flip-flop circuit 34. Therefore the flip-flop circuit 34 remains in that condition during which the breakage and cutting-off of the material being reeled on occur. As a result, from this time on at each revolution of the roll one register will erase old information and record a new one, while the other register will store the information on the length of the last turn of the material being reeled on, measured just before the breakage and cutting-off thereof.

Since comparing the recorded information with the information being recorded is effected continuously then in case the pulses recorded in both registers are equal, at the output of the coincidence circuit 37 there will appear a pulse which will hold the flip-flop circuit 33 through the input S thereof in condition "1" and permit counting of the paper being reeled on.

A modification of the proposed measuring device shown in FIG. 3 operates as follows. In the course of reeling-on at each revolution of the roll 5 the counter-registers 35, 36 alternately record in a binary code the number of pulses from the output of the length-meter 1 in the form $$N = \sum_{k=1}^{n} b_k 2^k \qquad (11)$$

where n=number of binary digits of the counter-register, $b_k \Sigma \{0.1\}$=coefficient for $2^k$.

The numerical value of the number N at each instance of time will be $$N = z \frac{2 \cdot R_p}{D_b}, \qquad (12)$$

where
z=resolution of the length-meter 1,
$D_b$=dia of the reeling machine carrying shaft,
$R_p$=current radius of the roll being formed.

The number $N_t$ determined according to the equation (12) and being proportional to the roll radius value at which braking of the reeling machine has to be started is preset through the switching unit 42 by connecting the outputs of the counter register 35 by positions according to the equation (11) with the inputs of the coincidence circuit 44. The number $N_o$ proportional to a preset value of the radius of the roll being formed is entered through the switching unit 43, by connecting outputs of the counter-register 36 to the inputs of the coincidence circuit 45. When the number of pulses equal to $N_t$ from the output of the length meter 1 is recorded in the counter-register 35 at all of its outputs switched in the coincidence circuit 44 there appear a level "0" in which case a signal "start braking" is formed at the output of the coincidence circuit 44 and at the output of the control unit 46, in response to which the reeling machine starts braking.

When the number of pulses equal to $N_o$ arriving from the output of the length-meter 1 is recorded in the counter-register 36 a signal "stop" is formed at the output of the control unit 46, in response to which the reeling machine stops running.

The proposed device allows automatic control of both braking and stoppage of a plano-cutting machine tool when the radius of the roll being formed assumes its preset value at any speed of reeling, which enables forming rolls with a constant diameter.

When the strip material area measuring device incorporates a control signal generator (FIG. 4) its operation is as follows. The capacity of the counter unit 29 is equal to the length of the strip material being reeled on during a time elapsed since the start of braking until the stoppage of the machine running at a nominal speed (1).

Before reeling a next roll (or after the preceding one has been completed) to the clearing line 20 is applied a pulse which reset the converters 21, 22, the flip-flop circuit RS 28, and the switching circuit 24, in which case to one of the inputs of the circuit 27 and to the input of the number value input unit 23 is applied a voltage enabling the latter to be connected to the control inputs of the code-to-digit converter 22.

The number corresponding to the length of the strip material being rolled up and represented in the predetermined units (for instance 10 m) is entered into the unit 23. In the course of reeling-on pulses from the output of the length-meter 1 are applied to the input of the scaling unit 25, and through the AND circuit 27 to the inputs of the counter unit 29, as well as to the inputs of the converter 22 through the second pair of the circuit 26.

The scaling unit 25 reduces the scale spacing of the output impulse to the preset value represented in a length unit (for instance 10 m).

With the resolving power of the length meter 1 being Z pulses per revolution, circumference of the machine carrying shaft being $\pi D_b$, and the scale spacing of the output impulse being, for instance, 10 m the scaling coefficient of the unit 25 will be $$K_m = (\pi Db/10z) \qquad (13)$$

As the frequency at the output of the scaling unit 25 is $K_m$ times lower than the frequency at its input, at the output of the counter unit 29 appears an overflow pulse before a pulse appears at the output of the unit 25, which overflow pulse will set the flip-flop circuit 28 to a neutral condition, thereby inhibiting the pulses from the output of the length-meter 1 to pass through the AND circuit 27 to the input of the counter unit 29, and through the second input pair of the circuit 26 to the input of the converter 22, and at the same time enabling the pulses from the output of the scaling unit 25 to pass through the input pair of the circuit 26 to the input of the converter 22. Thus, by the time the pulse appears at the informaion inputs of the converters 21, 22, from the output of the scaling unit 25 into the converter 22 will be entered and recorded the number $$\Delta N = \Delta L \qquad (14)$$

After the number of pulses equal to $$N_1 = L, \qquad (15)$$

where L=preset value of the length of the material in the roll, is applied from the output of the unit 25 to the inputs of the converters 21, 22, the converter 22 will record the number of pulses $N = N_1 + \Delta N = L$ equal to the number recorded in the number value input unit 23.

After a number of pulses $N_2 = L$ is applied from the output of the scaling unit 25 to the inputs of the converters 21, 22, there will appear, at the output of the converter 21, a pulse "stop" in response to which the machine stops running.

The above device when incorporated in the area-measuring device provides for automatic control of braking and stoppage of the reeling mechanism of the machine when the preset value of the length of the material in the roll is attained, at any operating speed and with the preset value of the required length of the strip material to be reeled on, which enables reeling-on of strip materials to a constant length.

This invention may be variously otherwise embodied within the scope of the appended claims.

What we claim is:

1. An area-measuring device for measuring area of strip materials being reeled on a reeling machine, comprising:
    a process blocking circuit having three inputs and an output, and adapted for blocking said measuring device in the case of breakage of the strip material being reeled on and subsequent cutting-off thereof;
    a length-meter having an output connected to one of said inputs of said process blocking circuit;
    a breakage-sensing element having an output connected to the other input of said inputs of said process blocking circuit;

a cutting device adapted for cutting off a strip material from the roll in the case of breakage of said strip material, and having an output connected to the third input of said process blocking circuit, and two inputs, one of which inputs being connected to said output of said length-meter, and the second input connected to said output of said breakage-sensing element;

a first two-position switch having an input lead, a first-position output lead and a second-position output lead, the first position output lead connected to said output of said process blocking circuit;

a common clearing line;

an intermediate memory counter, having a clearing input connected to said common clearing line, a count input connected to said input lead of said first two-position switch, and outputs;

a first controlled frequency divider having an output, control inputs connected by positions to said outputs of said intermediate memory counter, and a count input;

an overflow blocking unit having inputs connected to said outputs of said intermediate memory counter, and an output;

a reference frequency generator having an output connected to said count input of said first frequency divider;

a second controlled frequency divider having plural control inputs, a count input connected to said output of said reference frequency generator, and an output;

AND circuit means having an output connected to said second position output lead of said first two-position switch, and two inputs one of which inputs connected to said output of said overflow blocking unit, and the second input connected to said output of said reference frequency generator;

plural NAND logic circuits equal in number to the number of said inputs of said second controlled frequency divider, and each having first and second inputs, and outputs connected to said control inputs of said second controlled frequency divider;

a second two-position switch having first and second position output leads, the second position output lead connected to said first inputs of each said NAND circuit, and the first position output lead being grounded;

a correction input unit having outputs connected to said second inputs of each said NAND circuit;

a time interval generator having an input connected to said output of said second controlled frequency divider, at least one control input, and two outputs one of which being a clearing output;

at least one width-setting unit having an output connected to a respective control input of said time interval generator, and an output;

a coincidence circuit having two inputs, one of said two inputs connected to said output of the first controlled frequency divider, with the second input being connected to said output of said time interval generator, and an output; and a counter unit having an input connected to said output of said coincidence circuit, and a clearing output connected to said output of said time interval generator.

2. An area-measuring device for measuring area of strip materials as claimed in claim 1, wherein a device for cutting off strip material from a roll comprises:

a level pick-up including a pulse-type speed counter mounted on a reel shaft of the roll being formed and having an output;

a control unit having three inputs and three outputs, and comprising a single impulse generator having an input which is one of the outputs of said control unit and connected to said output of said pulse-type speed counter, and an output which serves as an output of said control unit;

an RS flip-flop circuit having inputs R and S which serve as the other two inputs of said control unit, the input R connected with said output of said breakage-sensing element, and a direct and an inverse outputs, with the inverse output being connected to one of the inputs of the process blocking circuit and serving as an information output of said device for cutting off the material being reeled on;

an AND logic circuit having two inputs one of which inputs being connected to said input of said single impulse generator, and the second one connected to the direct output of said flip-flop circuit RS, and an output;

A T flip-flop circuit having an input connected to the input of said AND logic circuit, and a direct and an inverse outputs which serve as outputs of said control unit;

a memory unit having six inputs and an output, and comprising
a first AND logic circuit having a first and a second inputs, the first input serving as one of the inputs of said memory unit and being connected to the direct output of said T flip-flop circuit, and an output;
a second AND logic circuit having first and second inputs which serve as the other inputs of said memory unit, the first input connected to said output of said length-meter and to said second input of said first AND logic circuit, and the second input being connected to said inverse output of said T flip-flop circuit, and an output;
a third AND logic circuit having a first and a second inputs serving as inputs of said memory unit, with the first input connected to said direct output of said T flip-flop circuit, and an output;
a fourth AND logic circuit having a first and a second inputs which serve as inputs of said memory unit, the first input connected to said second input of said third logic circuit and to said output of said single impulse generator, and an output;
a first counter-register having a count input, connected to said output of said first AND logic circuit, a clearing input connected to said output of said third AND logic circuit, and outputs;
a second counter-register having a count input connected to said output of said second AND logic circuit, a clearing input connected to said output of said fourth AND logic circuit, and output;
a comparator circuit having inputs connected to the corresponding outputs of said first and second counter-registers, and an output serving as an output of said memory unit and being connected to said input S of said RS flip-flop circuit.

3. A device for measuring area of strip materials as claimed in claim 2, wherein there are further included two switching units each having inputs connected to said outputs of the corresponding said counter-register, and outputs;

two coincidence circuits having each inputs connected to the outputs of said corresponding switching unit, and an output;

a control unit having two inputs, one of said two inputs connected to said outputs of said coincidence circuit, and outputs for connection with actuating mechanisms adapted to start braking of and to stop the reeling mechanism of the machine.

4. An area-measuring device for measuring area of strip materials being reeled on a reeling machine, comprising a process blocking circuit means having three inputs and an output for inhibiting operation of said area-measuring device in the case of breakage of and subsequent cutting off the material being reeled on;

length-meter having an output connected to one of said inputs of said process blocking circuit;

strip breakage-sensing means having an output connected to the other input of said inputs of said process blocking circuit, and a second output;

cutting means for cutting off the material from the roll in the case of breakage of the material being rolled up and having an output connected to the third input of said process blocking circuit, and two inputs one of which two inputs is connected to said output of said length-meter, and the second input is connected to said second output of the breakage-sensing means;

a first two-position switch having an input lead and first and second position output leads, the first position output lead being connected to said output of said process blocking circuit means;

a common clearing line;

an intermediate memory counter having a clearing input connected to said common clearing line, a count input connected to said input lead of said first two-position switch, and outputs;

a first controlled frequency divider having an output, control inputs connected by positions to said outputs of said intermediate memory counter, and a count input;

an overflow blocking unit having inputs connected to said outputs of said intermediate memory counter, and an output;

a reference frequency generator having an output connected to said count input of said first frequency divider;

a second controlled frequency divider having plural control inputs, a count input connected to said output of said reference frequency generator, and an output;

an AND circuit having an output connected to said second position output lead of said first two-position switch, and two inputs one of which is connected to said output of said overflow blocking unit, and the second one connected to said output of said reference frequency generator;

plural NAND logic circuits equal in number to the number of said control inputs of said second controlled frequency divider, and each having first and second inputs and outputs connected to respective control inputs of said second controlled frequency divider;

a second two-position switch having first and second position output leads, the second position output lead connected to said first inputs of each said NAND circuits, with the first position output lead being grounded;

a correction input unit having outputs connected to said second inputs of each said NAND circuit;

a time interval generator having an input connected to said output of said second controlled frequency divider, at least one control input and two outputs, one of which outputs serving as a clearing output;

at least one setting unit having an output connected to the corresponding control input of said time interval generator;

a coincidence circuit having one input connected to said output of the first controlled frequency divider, and a second input connected to said output of said time interval generator, and an output;

a counter unit having an input connected to said output of said coincidence circuit, and a clearing input connected to said output of said time interval generator;

a control signal generator having an input and two outputs, and comprising:

a scaling unit having an input which is the input of said control signal generator and connected to said output of said length-meter, and an output;

a first code-to-digit converter having control inputs and a clearing input connected to said common clearing line, an information input connected to said output of said scaling unit, and an output which serves as an output of said control signal generator and which is adapted for being connected to an actuating mechanism for stopping the reeling mechanism of the machine;

a second code-to-digit converter having control inputs and a clearing input connected to said common clearing line, an information input and an output serving as an output of said control signal generator and adapted for being connected to an actuating mechanism for braking the reeling mechanism of the machine;

a 2 AND-2 AND-OR circuit having two AND gates each with a pair of inputs, one of the inputs of the first input pair connected to said output of said scaling unit, and an OR gate connected to be driven by said two AND gates and having a output;

an RS flip-flop circuit having an S input connected to said common clearing line, an inverse output connected to the second input of the first input pair of said 2 AND-2 AND-OR circuit, and a direct output connected to one of the inputs of the second input pair of said 2 AND-2 AND-OR circuit;

an AND circuit having two inputs, one of which inputs is connected to the direct output of said RS flip-flop circuit, the second being input connected to the input of said scaling unit, and an output connected to the second input of the second input pair of said 2 AND-2 AND-OR circuit;

a counter unit having an input connected to the output of said AND circuit, and an output connected to the R input of said RS flip-flop circuit;

a switching circuit having two inputs, one of which inputs being connected to said common clearing line, with the second input being connected to the output of the second code-to-digit converter, and outputs;

a number value input unit having enabling inputs connected to said outputs of said switching circuit, and outputs one of which outputs being connected to said control inputs of said first code-to-digit converter, with the other outputs connected to the control inputs of said second code-to-digit converter.

5. An area measuring device for measuring area of strip materials as claimed in claim 4, wherein the device for cutting off the material from the roll comprises:

a level pick-up incorporating a pulse-type speed counter mounted on the shaft of the reel on which strip material is reeled, and having an output;

a control unit having three inputs and three outputs, and comprising a single impulse generator having an input serving as one of the inputs of said control unit, and being connected to said output of said pulse-type speed counter, and an output serving as an output of said control unit;

RS flip-flop circuit means having inputs R and S which are two other inputs of said control unit, the input R being connected to said output of said breakage-sensing element, and a direct and an inverse outputs, the inverse output being connected to one of the inputs of the process blocking circuit and serving as an information output of said cutting device for cutting off the material from the roll;

a further AND logic circuit AND having two inputs one of which is connected to said input of said single impulse generator, and the second one connected to the direct output of said RS flip-flop circuit, and an output;

a T flip-flop circuit having an input connected to an input of said further AND logic circuit, and a direct and an inverse outputs which serve as outputs of said control unit;

a memory unit having six inputs and an output, and comprising a first AND logic circuit having a first and a second input, the first input being one of the inputs of said memory unit and connected to the direct output of said T flip-flop circuit, and an output;

a second AND logic circuit having first and second inputs which serve as the other inputs of said memory unit the first input being connected to said output of said length-meter and to said second input of said AND logic circuit, with the second input connected to said inverse output of said flip-flop circuit, and an output;

a third AND logic circuit having first and second inputs which are the inputs of said memory unit, the first input being connected to said direct output of said T flip-flop circuit, and an output;

a fourth AND logic circuit having first and second inputs which are the inputs of said memory unit, the first input being connected to said second input of said third AND logic circuit and to said output of said single impulse generator, and an output;

a first counter-register, having a count input connected to said output of said first AND logic circuit, a clearing input connected to said output of said third AND logic circuit, and outputs;

a second counter-register, having a count input connected to said output of said second AND logic circuit, a clearing input connected to said output of said fourth AND logic circuit, and outputs;

a comparator circuit having inputs connected to the respective outputs of said first and second counter-register, and an output which is, at the same time, the output of said memory unit and connected to said input S of said RS flip-flop circuit.

6. An area-measuring device as claimed in claim 5, further including two switching units each having inputs connected to said outputs of the respective said counter-register, and outputs;

two coincidence circuits each having inputs connected to the outputs of the respective said switching unit, and an output;

a control unit having two inputs one of which inputs is connected to said outputs of said coincidence circuits, and outputs adapted to be connected to actuating mechanisms for braking and stoppage of the reeling mechanism of the machine.

* * * * *